March 30, 1937.  E. SCHIMANEK  2,075,231
INTERNAL COMBUSTION ENGINE
Filed Nov. 21, 1934   3 Sheets-Sheet 2

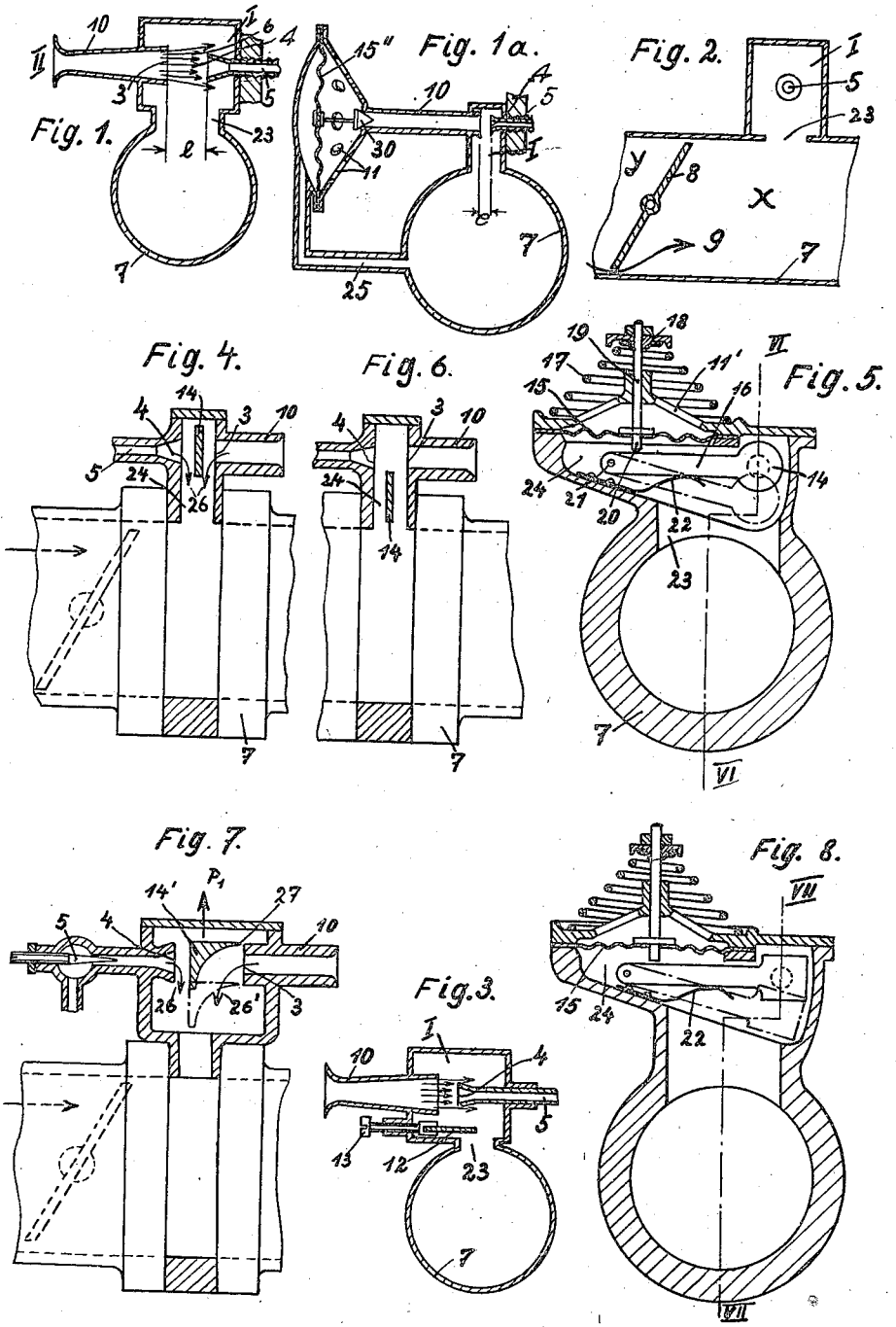

Emil Schimanek
INVENTOR
BY
ATTORNEY

March 30, 1937.  E. SCHIMANEK  2,075,231
INTERNAL COMBUSTION ENGINE
Filed Nov. 21, 1934  3 Sheets-Sheet 3

Emil Schimanek
INVENTOR

BY
ATTORNEY

Patented Mar. 30, 1937

2,075,231

UNITED STATES PATENT OFFICE 2,075,231

INTERNAL COMBUSTION ENGINE

Emil Schimanek, Budapest, Hungary, assignor to firm Société du Carburateur Stratos, Paris, France Application November 21, 1934, Serial No. 754,066 In Austria June 18, 1934

11 Claims. (Cl. 123—103)

This invention relates to a method of and means for automatically regulating the fuel or mixture supply to the engine of a vehicle or the like during changes in the operative conditions, more particularly during the period, during which the engine, running idle, is driven by the vehicle, when slowing down, travelling downhill, or the like, through the change in pressure occurring in the suction pipe of the engine.

The present invention makes use for the automatic regulation of the fuel supply during changes in the operative conditions, of the pressure which is produced by the dynamic effect of a gas or air flow emerging from an enclosed space with approximately constant pressure (atmospheric or exhaust chamber pressure) through a nozzle or the like into a space, in which there is a partial vacuum, on a surface disposed in the path of flow, which vacuum corresponds to the vacuum in the suction pipe of the engine, which varies in accordance with the changing operative conditions, a solution of the problem, which avoids the disadvantages of the known purely mechanical solutions (friction of parts moving against one another, influence of the wear on the effect and so on).

In the drawings in which various forms of the invention are illustrated more or less diagrammatically Figure 1 is a diagrammatic view showing in section a suction pipe of an engine embodying one form of the present invention.

Figure 1a is a sectional view of a suction pipe and associated parts embodying another form of the invention.

Figure 2 is a vertical sectional view of the suction pipe showing the valve arrangement.

Figure 3 is a sectional view of a suction pipe of an engine embodying a further form of the invention.

Figure 4 is a vertical sectional view and Figure 5 is a cross sectional view of a suction pipe and associated parts embodying a still further form of the invention.

Figure 6 is a view similar to Fig. 4 but showing the valve in inoperative position.

Figure 7 is a vertical sectional view and Figure 8 is a cross sectional view of a suction pipe and associated parts embodying a still further form of the invention.

Figure 9:
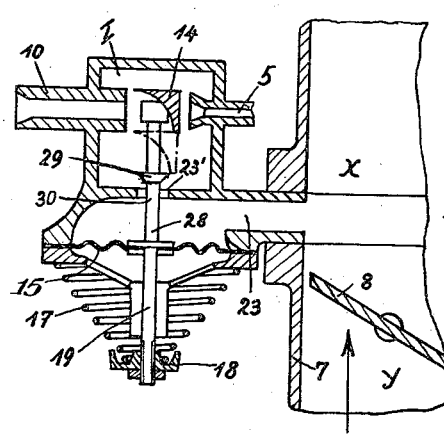
Figure 9 is a sectional view of a suction pipe and associated parts embodying a still further form of the invention.

As is well known, the dynamic pressure which a stream of air emerging from a pipe opening or the like exerts on a surface, plate or opening or the like disposed perpendicularly to its direction of flow is theoretically equal to the difference in pressure due to the velocity of the flow. Figs. 1 to 3 of the accompanying drawings illustrate these relations, showing in a purely diagrammatic manner the suction pipe of an engine in cross-section and in longitudinal section.

In Fig. 1 it is assumed that the pressure $p_1$ prevailing in the space or compartment I is less than the atmospheric pressure $p_2$ prevailing outside this space at the point II. Consequently the stream of air emerges from the opening 3 at such a velocity that the dynamic pressure exerted on the surface 4, which forms the orifice of a pipe 5, is theoretically equal to $p_2-p_1$. Hence the resultant pressure $p_4$ acting on the orifice surface 4 will be equal to the sum of the dynamic pressure at this place, $p_2-p_1$, and the static pressure $p_1$ in the space I, that is $p_4=p_1+p_2-p_1=p_2$, that is to say, $p_4$ will be equal to the atmospheric pressure. Actually this theoretical pressure $p_4$ is only formed when the orifice 3 is not far from the orifice 4. When the distance is greater, the stream will spread in the direction of the arrows 6 in Fig 1 and the velocity of flow will, owing to the eddying and friction with the air in the space I, become less, the further the cross-section of flow, in which the orifice 4 is situated, is from the orifice 3. Thus the dynamic effect on the surface 4 will be reduced if the distance $e$ between the orifices 3 and 4 is increased. The effect of the friction and eddying is all the greater, the lower the velocity of the flow. The pressure in the orifice 4 thus depends in reality on the magnitude of the pressure difference $p_2-p_1$ and on the distance $e$ between the orifices 3 and 4.

The utilization of these relations for regulating the fuel supply is effected in accordance with the invention in the following manner: In Fig. 2 the throttle valve 8 of the suction pipe 7 is brought into the position corresponding to idle running. The air flows in the direction of the arrow 9 out of the space $y$, in which approximately atmospheric pressure prevails, into the space $x$, in which a high degree of vacuum prevails. The engine is supplied through the pipe 5 with fuel (mixed or unmixed with air) which flows from the space I through the opening 23 into the suction pipe. At low speeds of revolution of the engine a lower degree of vacuum with respect to the atmospheric pressure will be formed in the suction pipe and consequently in the space I as well, than at high speeds of revolution. The shape of the space I and the dimensions of the pipes 10 and 5 and the distance $e$ are so selected that at a predetermined speed of revolution or at the vacuum corresponding to this speed of revolution the flow will take place as shown in Fig. 3 and at the orifice 4 there will be atmospheric pressure. The distance $e$ may be adjusted while the engine is running by displacing the pipe 5. A regulation of the speed of revolution or of the vacuum, at which the dynamic effect will adjust the fuel supply, can also be effected by enlarging or reducing the connecting opening 23 between the space I and the suction pipe 7. In Fig. 3 this can be effected by displacing the slide 12 by means of the screw 13.

In the mode of regulation illustrated in Figs. 1 to 3 the transition from the state in which the fuel is conveyed in accordance with idle running to the state in which the fuel supply is interrupted is a quite gradual one, and at the speeds during this transitional period an insufficient quantity of fuel reaches the engine, causing the latter to run in an irregular manner. In order to overcome this, the regulation or the interruption of the fuel supply can be effected according to the invention in such a manner, that through the provision of an auxiliary regulating device, the dynamic effect can become fully operative or operative at all with a jerk at certain pressure conditions in the suction pipe of the engine, or the like.

This can be brought about in a very simple manner, as Fig. 1a shows, by shutting off the outer opening of the inlet pipe 10 by means of a valve 30, or the like. The valve 30 is connected to a diaphragm 15'' which is under the influence of the vacuum prevailing in the suction pipe 7 and propagated through the small pipe 25. Only when the excessive vacuum causes the valve 30 to open will air flow through the openings 11 and through the pipe 10 into the space or compartment I and the dynamic effect become operative on the orifice 4 of the pipe 5 and interrupt the fuel supply until the vacuum in the suction pipe has again reached the normal value corresponding to the idle running state.

The constructional examples according to the invention, illustrated in Figs. 4 to 10 have the advantage that no valves or the like requiring effective sealing are used, so that any disturbances in the operation, which might occur owing to such a valve not being tight, are avoided.

In the constructional example illustrated in Figs. 4 to 6 a movable screen or plate 14 is interposed between the orifices 3 and 4, which is capable of being rocked by an arm 16 about a pivot pin 21 and is forced upwards by a spring 22. When in its top position (Fig. 4) this screen covers the orifice 4 with respect to the orifice 3, thus deflecting in the direction of the arrows 26 the flow of air and the fuel (or mixture) flowing out of the pipe 5. In this position, therefore, the dynamic effect of the inflowing air is destroyed. The lower surface of a diaphragm 15 is acted on by the vacuum prevailing in the space 24, while its upper surface is acted on by the atmospheric pressure through openings 11'. The diaphragm is further acted on upwardly by the force of a spring 17 which is adjustable by the spring plate 18 on the bar 19. By the stop 20 the arm 16 of the screen 14 is swung in accordance with the motion of the diaphragm. As long as the vacuum in the suction pipe 7 and consequently the vacuum in the space 24 does not exceed a definite value, the screen will be in the position shown in Fig. 4 and prevent the action of the dynamic effect on the orifice 4. When, however, the vacuum in the space 24 exceeds a certain value, the diaphragm will be bent downwards in opposition to the spring pressure and the stop 20 will force the arm 16 and the screen 14 downwards into the position shown in Fig. 5 in dot and dash lines and in Fig. 6 in full lines. The dynamic effect of the stream of air on the orifice 4 will thus become fully effective and the entrance of fuel through the pipe 5 will be definitely cut off.

In order to assist the change over of the screen 14 from one position into the other and to cause it to take place as suddenly as possible, the stream of air may be employed for exerting on the screen a force which accelerates the change over, when it has once been initiated.

Figs. 7 and 8 show by way of example a constructional form according to the invention in which the screen 14' has the form of a turbine blade. When the screen is in the usual position during normal operation (Fig. 7) the air flows along the blade surface of the screen in the direction of the arrow 26' and thereby exerts a force $P_1$ on the blade, which assists in holding the blade in its upper position. The fuel (or the over rich idle running mixture) flows in in the direction of the arrow 26 and exerts on the blade a horizontal force which has no component in the direction of displacement of the screen 14'. On the screen 14' being depressed by the diaphragm 15, owing to the excessive vacuum in the space 24 (Figs. 7 and 8), the edge 27 of the screen comes in front of the orifice 3 of the pipe 10 and less and less air will flow over the blade the further downwards the screen is moved, so that the force with which the screen is pressed upwards becomes smaller and smaller until it becomes zero at the position indicated by dash and dot lines. Hence the change over, after it has once been initiated, will take place suddenly, owing to force $P_1$ which is reduced to zero by the change over.

When the screen is in the bottom position shown in dot and dash lines in Figs. 7 and 8, it will not hinder the flow of air at all in exerting the dynamic effect on the orifice 4.

On the vacuum decreasing again and the diaphragm consequently returning to its upper position, the screen 14' is forced out of its bottom position, by the spring 22 upwards, its upward motion into the top position being suddenly accelerated by the force $P_1$, as soon as the edge 27 comes in front of the orifice 3, as this force will now rapidly increase from zero.

According to the invention the sudden change over of the screen can be further assisted through the vacuum in the space I being suddenly changed at the moment in which the screen is displaced by the diaphragm.

Figure 10:
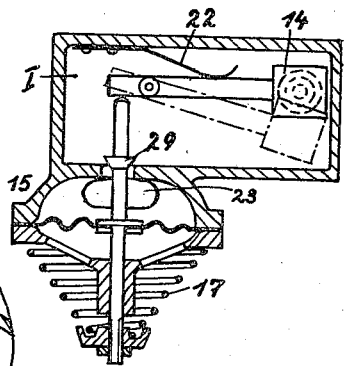
Figure 10 is a sectional view of a detail of the valve mechanism shown in Fig. 9.

In Figs. 9 and 10 such a constructional example is shown. The rod 19 which is connected to the diaphragm 15 is provided with a valve 29, which increases or decreases the size of the opening 23' and consequently the connecting opening 23 between the space I and the suction pipe 7. Since the valve 29 is never entirely closed, it is not required to provide a tight closure.

Figure 11:
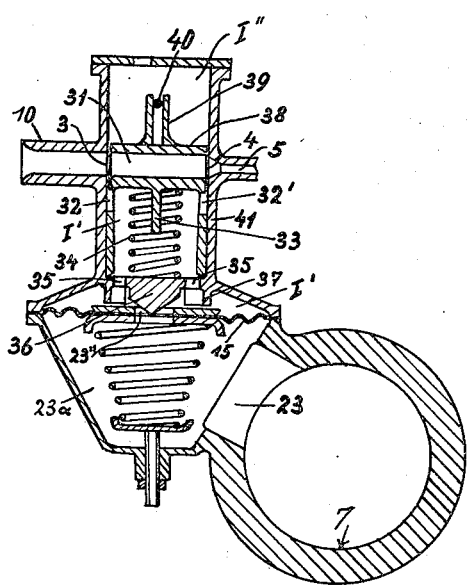
Figure 11 is a cross sectional view of a suction pipe and associated parts and Figure 12 is a vertical sectional view of the same embodying another form of the invention.
Figure 12:
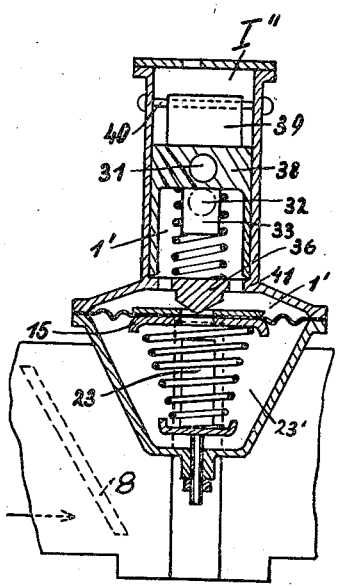

The sudden change over of the screen can also be effected by the diaphragm 15 which is influenced by the vacuum being used only as an intermediary member, the deformation of this diaphragm influencing any force exerting means, for instance in the constructional example shown in Figs. 11 and 12 the vacuum formed in the space or compartment I' being changed and in consequence of this change of pressure the corresponding sudden displacement of a regulating member being effected by the constant (atmospheric) pressure prevailing in the space or compartment I''. In Figs. 11 and 12 the diaphragm 15 is provided with an opening 23'' which coacts with the cone valve 36 which is disposed in the bottom of a cylinder 41, which is provided with apertures 35. On the diaphragm 15 being bent downwards through a rise in the vacuum in the space 23a, the passage between the opening 23'' and the cone 36 will be increased, whereby in the space I' in the cylinder 41 the vacuum is increased. The piston 38 which is forced upwards by the spring 34 is consequently suddenly displaced into its bottom position shown in Fig. 11 through the atmospheric pressure prevailing in the space I'', which acts on it from above. In this position the air entering through the pipe 10 will, flowing through the passage 31 in the piston 38, exert the dynamic effect on the orifice 4 of the pipe 5. When, however, owing to the diminution in the vacuum in the space 23a, the diaphragm 15 bends upwards until it comes in contact with the stop 37 in the bottom of the cylinder 41, the size of the passage between the opening 23'' and the cone 36 will be decreased and the vacuum in the space I' will consequently also drop, so that the piston 38 is suddenly displaced by the pressure of the spring 34 into the top position, in which the pipe orifice 3 is connected with the hole 32 and the orifice 4 with the hole 32' in the wall of the piston 38 and the screen 33 of the piston prevents the dynamic effect becoming operative.

For the sudden interruption and re-establishment of the fuel supply the influence of the critical outflow velocity on the dynamic effect can also be utilized, as is illustrated in Figs. 13 to 17.

It is a physical law that if a gas flows out of a space with a higher pressure ($p_1$) through an opening into a space with a lower pressure ($p_2$), then the velocity wherewith the gas flows through said opening is given by the formula $$v = \sqrt{2g\frac{\Delta p}{\gamma}},$$

where $g = 9.81$ m./sec. (= the acceleration of gravity), $p = p_1 - p_2$ the pressure-difference between the two spaces, and $\gamma$ the specific weight of the gas in the opening. This velocity, however, occurs only so long until the pressure $p_2$ becomes $= 0.528\, p_1$. In this case the velocity of outflow of the gas is equal to the velocity of sound.

If, thereupon, $p_2$ becomes smaller than $0.528\, p_1$ the velocity of outflow does not grow any longer, but remains constantly the same as by $p_2 = 0.528\, p_1$.

It is also a well known principle that the stow-pressure on a plane perpendicularly arranged with respect to the direction of flowing is equal to $$\frac{v^2}{2g}\gamma,$$

where $v =$ velocity of flow of the gas, $\gamma =$ the specific weight of the gas and $g =$ the constant of gravity.

When the pressure $p_1$ in a space or compartment I (Fig. 13), into which air flows out of a space II in which the pressure $p_2$ prevails, drops below half the pressure $p_2$ (actually below $0.53 p_2$), then, if no Laval nozzle is being used, the pressure at the orifice 3 of the inflow pipe 10 will have the constant value $0.53 p_2$ and the outflow velocity of the air from this orifice will, independently of the pressure in the space I, always be equal to the velocity of sound. Hence, the dynamic pressure exerted on a surface, plate or opening or the like, disposed in the path of the flow of air, will always remain constant, as long as the pressure in the space I amounts to less than $0.53 p_2$. Thus, when in an arrangement such as that shown diagrammatically in Fig. 13 air flows through the pipe 10 out of the space II into the space I, while through the pipe 5' no flow takes place (as the space or compartment III connected to it is shut off), the pressure in the space III is determined by two additive pressures: 1st through the static pressure $p_1$ in the space I and 2nd through the dynamic pressure $p_1'$ of the flow of air.

Figure 14:
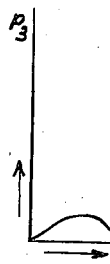
Figure 14 is a diagrammatic view showing the pressure curves.
Figure 13:
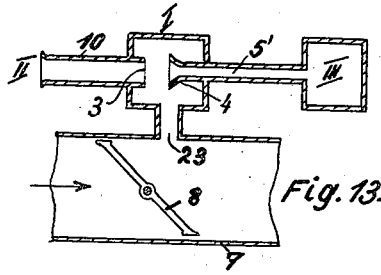
Figure 13 is a sectional view of a suction pipe and associated parts embodying another form of the invention.

It follows from what was stated at the commencement of the specification and in the previous paragraph that, on the vacuum in the space I increasing (that is to say on the pressure $p_1$ dropping), the pressure in the space III ($p_3$) will follow the course shown in Fig. 14: Owing to the friction and the eddying in the space I the vacuum at the orifice 4 and therefore in the space III as well will, with a vacuum in the space I or in the suction pipe increasing from zero, first of all increase a little, but then drop again and at a definite pressure $p_1$ become zero again. This zero value of the vacuum, which corresponds to a pressure $p_3 = p_1 + p_1'$, will remain unchanged, until the pressure $p_1$ in the space I drops below the value $0.53 p_2$. From this point onwards the dynamic pressure $p_1'$ remains constant and consequently the pressure $p_4$ at the orifice 4 or $p_3$ in the space III become smaller and smaller as $p_1$ decreases, that is with an increasing vacuum in the suction pipe. In other words, the vacuum at the orifice 4 and in the space III will become greater and greater the rise of the vacuum being a rapid one. When the space I is connected to the suction pipe of the engine or to some other space in which the vacuum is greater than half an atmosphere, the vacuum produced in the space I can be given different values by altering the cross-section of the connecting passage 23. Hence in the space I the absolute pressure $0.53 p_2$ will, on the vacuum in the suction pipe increasing, be reached sooner or later, according to whether the connecting cross-section 23 is greater or smaller. If therefore, as shown in Fig. 14, the vacuum in the space III be represented as a function of the vacuum prevailing in the suction pipe, then we obtain the pressure curve $p_3$ or $p_3'$ or $p_3''$ and so on, according to the size of the connecting cross-section 23. The vacuum in the suction pipe at which the sudden change of the pressure $p_3$ occurs, can thus be regulated. This sudden increase in the vacuum in the space III is utilized for regulating the fuel supply through the space III being shut off by a diaphragm, piston or the like. The sudden increase in vacuum bends the diaphragm or displaces the piston or the like, whereby the fuel supply can be influenced.

Figure 15:
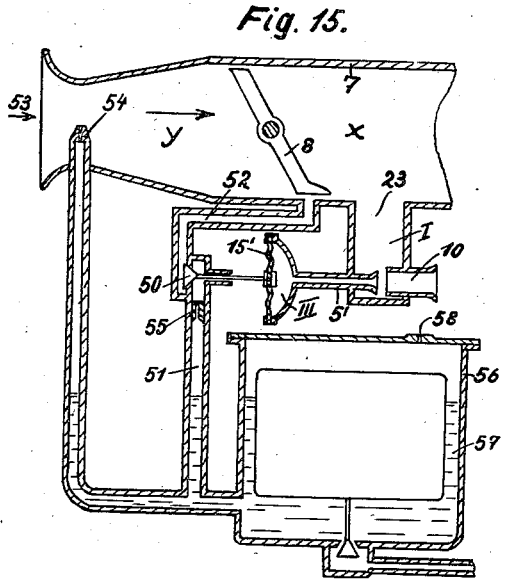
Figures 15, 16 and 17 are vertical sectional views of a suction pipe and associated parts of an engine, each embodying a still different form of the invention.
Figure 16:
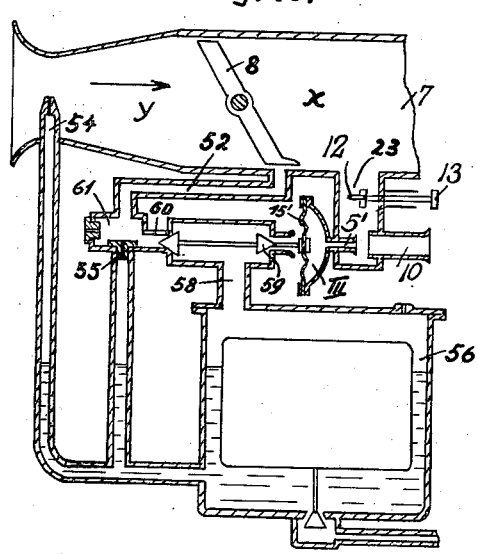
Figure 17:
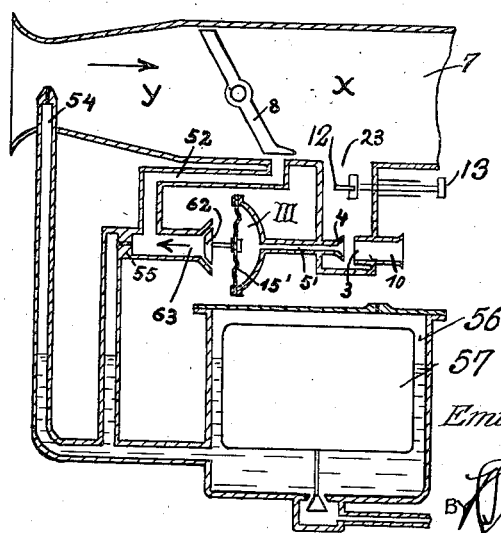

Making use of these relations, constructional examples are shown in Figs. 15 to 17, in which for example a more complicated arrangement, viz. a carburettor arrangement is used, which has a main nozzle 54 for the operation and a separate nozzle 55 for idle running. The float casing 56 with the float 57 and the venting opening 58 is constructed in the usual manner.

In Fig. 15 the space III is shut off by a diaphragm 15' which, on the vacuum increasing, closes a valve 50, and thereby cuts off the supply of the fuel flowing through the upright pipe 51. Hence no fuel can flow into the suction pipe 7 through the idle running pipe 52.

In Fig. 16 the vacuum which suddenly rises in the space III closes by means of the diaphragm 15' the valve 59, through which the atmospheric air pressure is transmitted through the opening 58 into the upper space of the float casing 56, and at the same time opens the valve 60, so that simultaneously the float casing is shut off from the atmospheric pressure and the vacuum prevailing in the space 61 is transmitted into the float chamber 56. Owing to this pressure equalization, the conveyance through the idle running nozzle 55 ceases, until the vacuum in the space III has again suddenly dropped to zero or approximately to zero and the diaphragm 15' again changes over the valves 59, 60.

In Fig. 17 a constructional example is shown, in which the dynamic effect is doubly utilized: firstly, as in the previous examples (Figs. 15 and 16) at the orifice 4 in the flow of air coming from the orifice 3, whereby the suddenly increasing vacuum $p_3$ illustrated in Fig. 14 is caused to act on the diaphragm 15'; secondly, at the nozzle 55 through the opening of the valve 62, the air flowing through the passage 63 cutting off, owing to its dynamic effect, the fuel supply through the nozzle 55, as soon as the valve 62 is opened. The vacuum in the suction pipe, at which the doubly utilized dynamic effect becomes effective, can be regulated as desired by altering the connecting cross-section 23, which may be carried out in any suitable manner.

An adjustment of the device shown in Figs. 16 and 17 may be made similar to that shown in Fig. 3. Thus the connecting opening can be enlarged or reduced by means of the slide 12.

What I claim is:

1. An apparatus for automatically regulating the fuel supply to an internal combustion engine having a suction pipe connected with a fuel supply system comprising means for cutting off the fuel supply through the automatic application to the fuel supply system of a substantially constant pressure when the engine speed maintains a suction in said pipe to create a pressure therein less than said substantially constant pressure.

2. An apparatus for automatically regulating the fuel supply to an internal combustion engine comprising a suction pipe, a throttle valve in said suction pipe, means providing a source of substantially constant pressure to said pipe, and means connected to the flow path of the fuel supply and communicating said pipe whereby the gas supply to the engine is automatically interrupted by means of the source of substantially constant pressure when the throttle valve is closed and a suction remains in said pipe.

3. In an apparatus for regulating the fuel supply for an internal combustion engine, a suction pipe, a throttle valve in said suction pipe, a compartment in communication with said suction pipe at a point behind the valve, a pipe having one end terminating in said compartment and its other end communicating with the atmosphere and a fuel supply pipe having one end terminating in said compartment, one of said pipes being movable relative to the other for adjusting the distance therebetween.

4. An apparatus as described in claim 3 characterized by having a movable member in the line of communication between the suction pipe and compartment for adjusting the cross sectional area of said line of communication.

5. An apparatus as described in claim 3 characterized by having a valve in the air supply pipe leading to the compartment and a diaphragm for actuating said valve, said diaphragm being under the influence of a vacuum on one side and of atmospheric pressure on the other side.

6. In apparatus of the kind described for internal combustion engines, the combination with the suction pipe and a throttle valve in the pipe, of a compartment having a passage in communication with the suction pipe at a point behind the valve, an air supply pipe having one of its ends terminating in said compartment and its other end communicating with the atmosphere, a pipe having one of its ends terminating in the compartment, another compartment in communication with said latter pipe, a diaphragm forming one wall of said latter compartment, a nozzle in the fuel supply line, and a valve in the fuel supply line controlling said nozzle, said diaphragm being operatively connected to said latter valve for actuating the same.

7. In apparatus of the kind described for internal combustion engines, the combination with the suction pipe and a throttle valve therein, of a compartment having a passage communicating with said suction pipe behind said valve, an air supply pipe having one end terminating in the compartment and its other end communicating with the atmosphere, a pipe having one end terminating in the compartment, another compartment in communication with said latter pipe, a diaphragm forming one wall of said latter compartment, a fuel casing in normal communication with the atmosphere, a pipe in communication with said casing for conveying fuel for idle running, a nozzle in said latter pipe, and mechanism for cutting off direct communication between the casing and atmosphere and establishing communication between said casing and the suction pipe whereby the pressure in the casing and second named fuel pipe is equalized, said mechanism including a pair of valves adapted to be operated in unison by the diaphragm, one of said valves being in the line of communication between said casing and the atmosphere and the other in the line of communication between the casing and the second named fuel pipe, and a float in the fuel casing adapted to be influenced by either of said latter valves for controlling the fuel supply for idle running.

8. In apparatus of the kind described for internal combustion engines, the combination with the suction pipe and a throttle valve therein, of a compartment communicating with said suction pipe behind said valve, an air supply pipe having one of its ends terminating in the compartment and its other end communicating with the atmosphere, a pipe having one of its ends terminating in the compartment, another compartment in communication with said pipe, a diaphragm forming one wall of said second named compartment and mechanism for conveying fuel for idle running including a pipe, a nozzle therein, and a valve in an air supply pipe conveying air to said nozzle, said latter valve being operatively connected to the diaphragm whereby atmospheric air is admitted to the nozzle for creating a dynamic effect thereon to influence the fuel supply.

9. Apparatus of the kind described in claim 3 characterized by a regulating device which subjects the fuel supply to the action of a back pressure when a certain predetermined vacuum is exceeded and which permits withdrawal of said action upon the return to normal running condition.

10. In an apparatus for regulating the fuel supply for an internal combustion engine, a suction pipe, a throttle valve in said suction pipe, a compartment in communication with said suction pipe at a point behind the valve, a pipe having one end terminating in said compartment and its other end communicating with the atmosphere and a fuel supply pipe having one end terminating in said compartment.

11. In a device for automatically controlling the fuel supply for an internal combustion engine, a suction pipe having a throttle valve therein, a compartment communicating with said suction pipe behind said valve, a pipe leading from the atmosphere into said compartment, and a pipe means opposite and spaced from said atmospheric pipe in said compartment to vary in conjunction with said atmospheric pipe the fuel supply upon variations of pressure in said suction pipe.

EMIL SCHIMANEK.